(12) United States Patent
Doren et al.

(10) Patent No.: US 9,274,812 B2
(45) Date of Patent: Mar. 1, 2016

(54) METHOD OF CONFIGURING MOBILE COMPUTING DEVICE

(75) Inventors: Michael Doren, Skaneateles Falls, NY (US); Krishan Kumar, Hyderabad (IN); Manjunatha Swamy, Hyderabad (IN)

(73) Assignee: Hand Held Products, Inc., Skaneateles Falls, NY (US)

( * ) Notice: Subject to any disclaimer, the term of this patent is extended or adjusted under 35 U.S.C. 154(b) by 849 days.

(21) Appl. No.: 13/267,175

(22) Filed: Oct. 6, 2011

(65) Prior Publication Data

US 2013/0091344 A1    Apr. 11, 2013

(51) Int. Cl.
| | |
|---|---|
| *G06F 9/00* | (2006.01) |
| *G06F 15/177* | (2006.01) |
| *G06F 9/445* | (2006.01) |
| *G06F 3/12* | (2006.01) |
| *G06F 12/06* | (2006.01) |
| *H04L 29/08* | (2006.01) |
| *H04L 12/24* | (2006.01) |

(52) U.S. Cl.
CPC .......... *G06F 9/44505* (2013.01); *G06F 3/1254* (2013.01); *G06F 8/65* (2013.01); *G06F 12/0646* (2013.01); *H04L 41/0806* (2013.01); *H04L 41/0866* (2013.01); *H04L 67/34* (2013.01)

(58) Field of Classification Search
CPC ....... G06F 8/65; G06F 12/0646; G06F 3/154; H04L 41/0806; H04L 67/34; H04L 41/0803; H04L 41/0866
USPC ............................................................ 713/2
See application file for complete search history.

(56) References Cited

U.S. PATENT DOCUMENTS

| | | | |
|---|---|---|---|
| 6,026,379 A | 2/2000 | Haller et al. | |
| 6,072,870 A | 6/2000 | Nguyen et al. | |
| 6,119,105 A | 9/2000 | Williams | |
| 6,178,409 B1 | 1/2001 | Weber et al. | |
| 6,466,972 B1 | 10/2002 | Paul et al. | |
| 6,505,245 B1 | 1/2003 | North et al. | |
| 6,601,095 B1 | 7/2003 | Duffield et al. | |
| 7,194,507 B2 * | 3/2007 | Sato et al. .................... | 709/203 |
| 7,317,699 B2 | 1/2008 | Godfrey et al. | |
| 7,324,473 B2 | 1/2008 | Corneille et al. | |
| 7,437,752 B2 | 10/2008 | Heard et al. | |
| 7,511,848 B2 | 3/2009 | Crosier et al. | |
| 7,583,960 B2 | 9/2009 | Wierman et al. | |
| 7,593,897 B2 | 9/2009 | Kolls | |
| 7,627,656 B1 | 12/2009 | Anand et al. | |
| 7,630,939 B1 | 12/2009 | Kolls | |
| 7,657,612 B2 | 2/2010 | Manchester et al. | |
| 7,665,118 B2 | 2/2010 | Mann et al. | |
| 7,690,495 B1 | 4/2010 | Kolls et al. | |
| 7,710,587 B2 | 5/2010 | Crosier et al. | |
| 7,774,441 B2 | 8/2010 | Frutiger et al. | |
| 7,787,863 B2 | 8/2010 | Van de Groenendaal | |
| 7,933,231 B1 | 4/2011 | Huang et al. | |
| 7,934,660 B2 | 5/2011 | Yeakley et al. | |
| 7,984,199 B2 | 7/2011 | Ferguson et al. | |

(Continued)

*Primary Examiner* — Jaweed A Abbaszadeh
*Assistant Examiner* — Xuxing Chen
(74) *Attorney, Agent, or Firm* — Additon, Higgins & Pendleton, P.A.

(57) ABSTRACT

A method of storing configuration data for mobile computing devices can comprise the steps of providing a master configuration file including one or more parameter records and providing a device file including one or more device records. Each parameter record can map a parameter value to a parameter identifier. Each device record can map a parameter identifier to a mobile computing device identifier.

22 Claims, 7 Drawing Sheets

101 Master configuration file

| | Parameter identifier | Parameter Value |
|---|---|---|
| 105a | | |
| 105b | | |
| ... | | |
| 105z | | |

111 Devices file

| | Device identifier | Parameter identifiers |
|---|---|---|
| 115a | | |
| 115b | | |
| ... | | |
| 115z | | |

(56) References Cited

U.S. PATENT DOCUMENTS

| Patent/Publication | Kind | Date | Inventor | Class |
|---|---|---|---|---|
| 8,037,015 | B2 | 10/2011 | Kent et al. | |
| 2001/0055978 | A1 | 12/2001 | Herrod et al. | |
| 2003/0055751 | A1* | 3/2003 | Sasnowitz | 705/28 |
| 2003/0070063 | A1* | 4/2003 | Boyle et al. | 713/2 |
| 2004/0193614 | A1* | 9/2004 | Perlman | 707/100 |
| 2004/0267971 | A1 | 12/2004 | Seshadri | |
| 2005/0086328 | A1 | 4/2005 | Ladram et al. | |
| 2005/0198221 | A1 | 9/2005 | Manchester et al. | |
| 2005/0225530 | A1 | 10/2005 | Evans et al. | |
| 2005/0245249 | A1 | 11/2005 | Wierman et al. | |
| 2005/0260973 | A1 | 11/2005 | Van de Groenendaal | |
| 2005/0260996 | A1 | 11/2005 | Van de Groenendaal | |
| 2006/0082817 | A1 | 4/2006 | Crosier et al. | |
| 2006/0101459 | A1 | 5/2006 | Crosier et al. | |
| 2006/0106918 | A1 | 5/2006 | Evert et al. | |
| 2006/0123411 | A1 | 6/2006 | Hanson et al. | |
| 2006/0190984 | A1 | 8/2006 | Heard et al. | |
| 2006/0208931 | A1 | 9/2006 | Boese et al. | |
| 2006/0242685 | A1 | 10/2006 | Heard et al. | |
| 2006/0294209 | A1 | 12/2006 | Rosenbloom et al. | |
| 2007/0152058 | A1 | 7/2007 | Yeakley et al. | |
| 2007/0266109 | A1 | 11/2007 | Mellott et al. | |
| 2008/0025243 | A1 | 1/2008 | Corneillet et al. | |
| 2008/0028326 | A1 | 1/2008 | Wilson | |
| 2008/0034075 | A1 | 2/2008 | Luinstra et al. | |
| 2008/0051075 | A1 | 2/2008 | Einloth et al. | |
| 2008/0051076 | A1 | 2/2008 | O'Shaughnessy et al. | |
| 2008/0059432 | A1* | 3/2008 | Tan et al. | 707/3 |
| 2008/0059567 | A1 | 3/2008 | Williams et al. | |
| 2008/0107042 | A1 | 5/2008 | Rengarajan et al. | |
| 2008/0147831 | A1 | 6/2008 | Redjaian et al. | |
| 2008/0192751 | A1 | 8/2008 | Xiong et al. | |
| 2008/0266407 | A1 | 10/2008 | Battles et al. | |
| 2008/0275903 | A1 | 11/2008 | Kent et al. | |
| 2008/0276006 | A1 | 11/2008 | Choi | |
| 2008/0276182 | A1 | 11/2008 | Leow | |
| 2009/0164668 | A1 | 6/2009 | Duckett | |
| 2009/0228868 | A1 | 9/2009 | Drukman et al. | |
| 2009/0258595 | A1 | 10/2009 | Gielow et al. | |
| 2009/0258683 | A1 | 10/2009 | Gielow et al. | |
| 2010/0165877 | A1* | 7/2010 | Shukla et al. | 370/254 |
| 2010/0180016 | A1* | 7/2010 | Bugwadia et al. | 709/220 |
| 2010/0242037 | A1 | 9/2010 | Xie et al. | |
| 2010/0267376 | A1 | 10/2010 | Saari | |
| 2011/0066950 | A1 | 3/2011 | Wilson et al. | |
| 2011/0154101 | A1 | 6/2011 | Merwe et al. | |
| 2011/0173685 | A1 | 7/2011 | Chai et al. | |
| 2011/0209203 | A1 | 8/2011 | Shafer | |
| 2011/0225647 | A1 | 9/2011 | Dilley et al. | |
| 2011/0292920 | A1 | 12/2011 | Krieter | |
| 2011/0302408 | A1 | 12/2011 | McDermott et al. | |
| 2012/0220268 | A1* | 8/2012 | Smith et al. | 455/411 |
| 2013/0054575 | A1* | 2/2013 | Bodin et al. | 707/722 |

\* cited by examiner

101 Master configuration file

|  | Parameter identifier | Parameter Value |
|---|---|---|
| 105a | | |
| 105b | | |
| ... | | |
| 105z | | |

111 Devices file

|  | Device identifier | Parameter identifiers |
|---|---|---|
| 115a | | |
| 115b | | |
| ... | | |
| 115z | | |

Fig. 1

```
<?xml version ="1.0" encoding="UTF-8" ?>

<section name="WLAN settings">

<parameter name="access point channel" value ="1" />

<parameter name="access point authentication" value ="open" />

</section>

<section name="printer settings">

<parameter name="printer IP" value ="192.168.1.1" />

<parameter name="printer type" value ="postscript" />

</section>

</xml>
```

METHOD OF CONFIGURING MOBILE COMPUTING DEVICE

FIELD OF THE INVENTION

The invention is generally related to mobile computing devices and is specifically related to methods of configuring mobile computing devices.

BACKGROUND OF THE INVENTION

Various organizations, including retail and manufacturing businesses, can employ sizable fleets of mobile computing devices (e.g., encoded information reading (EIR) terminals configured to read bar codes and/or other types of encoded information). A number of actions typically need to be performed upon the mobile computing devices as part of the device fleet management operations, including device configuration updates. Effectively storing device configuration data and configuring mobile computing devices can require substantial planning and effort.

SUMMARY OF THE INVENTION

In one embodiment, there is provided a method of storing configuration data for mobile computing devices. The method can comprise the steps of providing a master configuration file including one or more parameter records and providing a device file including one or more device records. Each parameter record can map a parameter value to a parameter identifier. Each device record can map a parameter identifier to a mobile computing device identifier.

In another embodiment, there is provided a method of configuring a mobile computing device. The method can comprise the steps of reading a device file to select one or more device records comprising one or more parameter identifiers corresponding to an identifier of the mobile computing device being configured, reading a master configuration file to select one or more parameter records comprising parameter values corresponding to one or more parameter identifiers selected at the previous step, and configuring the mobile computing device by assigning the parameter values to the parameter identifiers.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

In one embodiment, there is provided a method of storing configuration data for a plurality of mobile computing devices. Device configuration data can be stored in configuration files. In one embodiment, the configuration files can be provided by XML files using a standard or proprietary XML schema. In another embodiment, the configuration files can be provided by text files. In a yet another embodiment, the configuration files can be provided by binary files.

Figure 1:
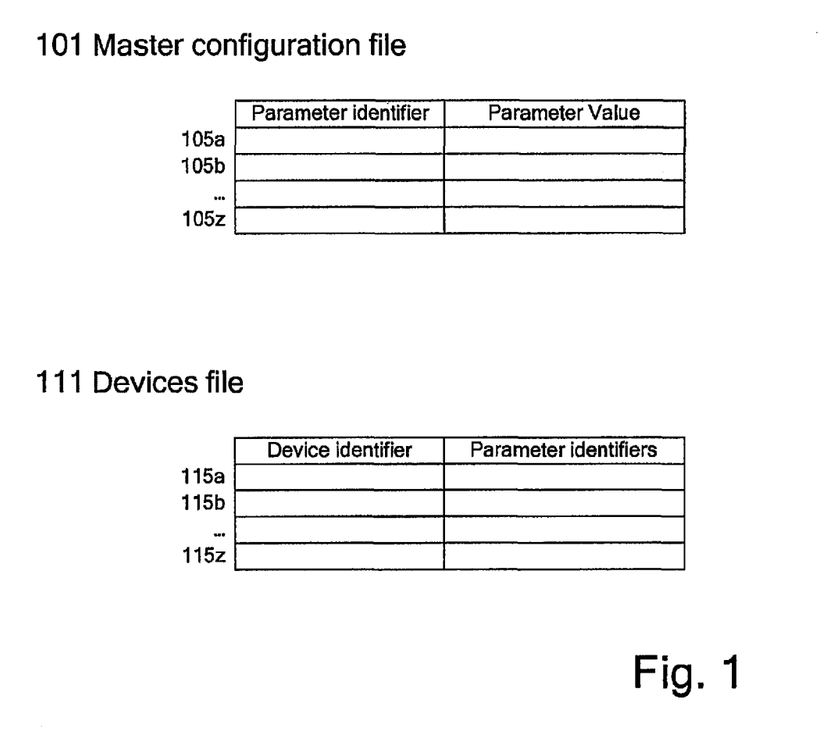
FIG. 1 illustrates exemplary file structures of device configuration files.

In one embodiment, device configuration data for multiple devices (types of devices) can be stored using two configuration files: a master configuration file and a device file, as schematically illustrated in FIG. 1a. Master configuration file 101 can comprise one or more parameter records 105a-105z. Each parameter record can map a parameter value to a parameter unique identifier. In order to use the master configuration file to store parameter values for multiple devices and types (models) of devices, in one embodiment, a second configuration file, referred to as device file herein, can be provided to indicate which parameters are to be used with a given mobile computing device. Device file 111 can comprise one or more device records 115a-115z. Each device record can map a parameter identifier to a mobile computing device identifier.

In one embodiment, a mobile computing device identifier can be provided by a model number of the mobile computing device. In another embodiment, a mobile computing device identifier can be provided by a serial number of the mobile computing device. A skilled artisan would appreciate the fact that other types of mobile computing device identifiers are within the scope of this disclosure.

The above described configuration file structure can advantageously be used for configuring one or more mobile computing devices. In a situation when multiple parameters need to be set or updated for multiple computing devices (e.g., when one or more new mobile computing devices are being added to an existing fleet of mobile computing devices), a list of applicable parameters can be built for every mobile computing device by selecting the device records corresponding to the mobile computing device, and then the corresponding parameter values can be read from the master configuration file. In a situation when one or more parameter values need to be updated on multiple computing devices (e.g., a configuration server IP address), a list of affected mobile computing devices can be built for every parameter to be updated by selecting device identifiers corresponding to the identifier of the parameter to be updated, and then the parameter values can be read from the master configuration file.

In a further aspect, the master configuration file can contain:

radio settings for 802.11, Bluetooth®, and GSM/GPRS radios;

WLAN, WWAN, and WPAN configurations, including parameters of the network infrastructure elements, such as printers and access points;

power management settings, including battery and external power timeouts, and backlight behavior;

device registry settings; and/or application parameters.

A skilled artisan would appreciate the fact that other parameters and settings which can be used in configuring mobile computing devices are within the spirit and the scope of this disclosure.

Figure 2:
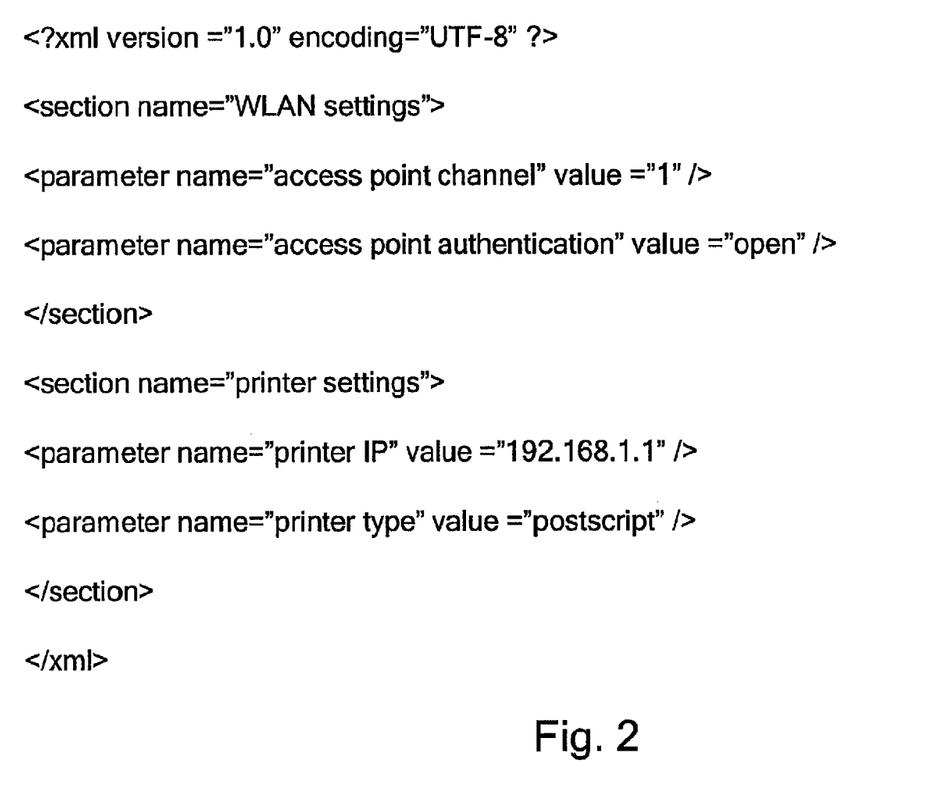
FIG. 2 illustrates an example of a master configuration file.

In a further aspect, the master configuration file can be divided in two or more sections grouping multiple related parameters as shown in FIG. 2.

Figure 3:
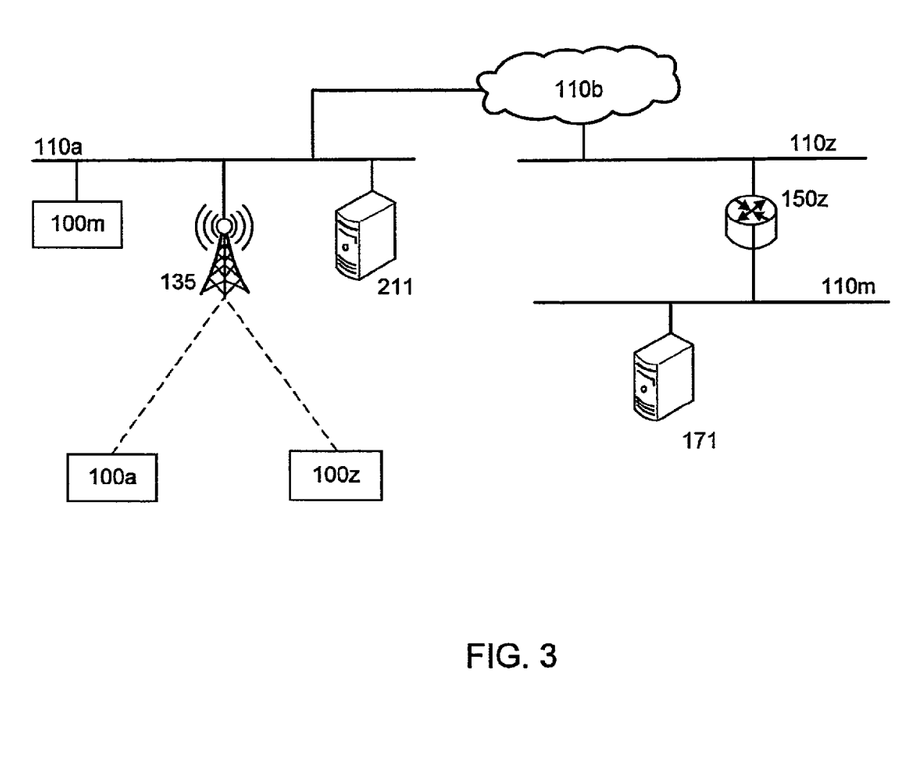
FIG. 3 illustrates an exemplary network layout of a device configuration system.

In a further aspect, the configuration files 101 and 111 can reside on a computer 171 accessible over one or more local and/or wide area networks 110a-110z, as schematically illustrated in FIG. 3. A "computer" herein shall refer to a programmable device for data processing, including a central processing unit (CPU), a memory, and at least one communication interface. A computer can be provided, e.g., by a personal computer (PC) running Linux operating system. In one embodiment, configuration files 101 and 111 residing on computer 171 can be read by one or more mobile computing devices 100a-100z to be configured using configuration data stored in the configuration files. In another embodiment, configuration files 101 and 111 can be read by a computer external relatively to mobile computing devices 100a-100z. The external computer can be configured to select the relevant configuration data from the configuration files and then to transmit the configuration data to one or more mobile computing devices, as described more in details herein infra. In one embodiment, the external computer can be provided by computer 171 hosting configuration files 101 and 111. In another embodiment, the external computer can be provided by computer 211 which can access computer 171 over one or more local and/or wide area networks 110a-110z. In a yet another embodiment, a mobile computing device 100a can access configuration files 101 and 111 over one or more local and/or wide area networks 110a-110z, and then transmit the configuration data to one or more peer mobile computing devices 100b-100z.

In one embodiment, configuration data can be transmitted to a mobile computing device 100a-100z by a peer mobile computing device or by an external computer over one or more local and/or wide area networks 110a-110z. A mobile computing device 100 can connect to one or more networks 110a-110z, e.g., via a wireless access point 135. In one embodiment, at least one of networks 110a-110z can be provided by an IEEE 802.11x-compliant wireless network. In another embodiment, at least one of networks 110a-110z can be provided by an Ethernet network. In another embodiment, at least one of networks 110a-110z can be provided by a local area network (LAN). In another embodiment, at least one of networks 110a-110z can be provided by a wide area network (WAN). While different networks are designated herein, it is recognized that a single network as seen from the network layer of the OSI model can comprise a plurality of lower layer networks, i.e., what can be regarded as a single Internet Protocol (IP) network, can include a plurality of different physical networks.

In another embodiment, a peer mobile computing device or an external computer can encode the configuration data into one or more decodable indicia symbols which then can be read and decoded by one or more mobile computing devices 100a-100z. In one embodiment, one or more decodable indicia symbols can be printed on a substrate (e.g., paper) and then can be read by one or more mobile computing devices 100a-100z. In one embodiment, one or more decodable indicia symbols can be displayed on a display of an external computer or a peer mobile computing device and then can be read by one or more mobile computing devices 100a-100z.

In another aspect, a mobile computing device can be reconfigured by assigning parameter values to the specified parameters. In one embodiment, the mobile computing device can launch a configuration application responsive to receiving configuration data over the device's communication interface. In one embodiment, the mobile computing device can launch a configuration application responsive to reading and decoding one or more decodable indicia symbols containing configuration data. In a further aspect, the configuration data can include the identifier and/or parameter of the configuration application to be launchd by the mobile computing device.

In another aspect, the configuration files can be created and/or edited using a GUI-based configuration editor and/or a text editor.

Figure 4:
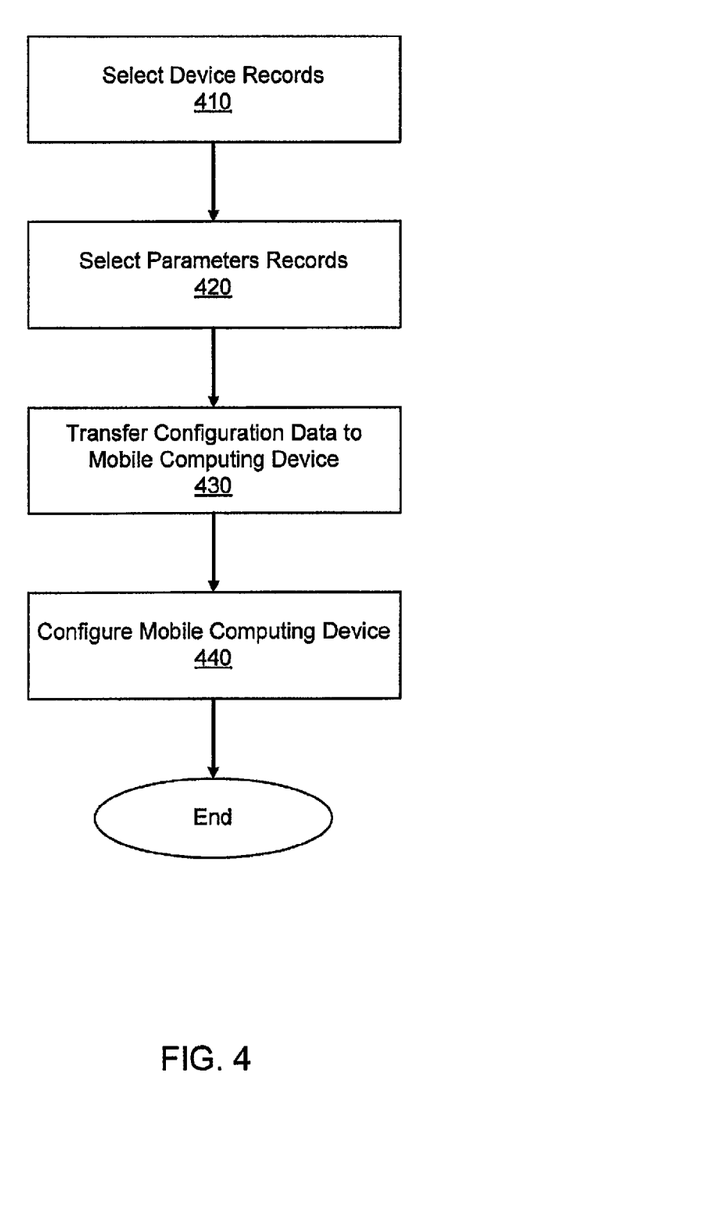
FIG. 4 illustrates one embodiment of a method of configuring a mobile computing device.

One embodiment of a method of configuring a mobile computing device is now being described with references to the flowchart depicted in FIG. 4.

At step 410, the device file can be read to select one or more device records. Each device record can comprise a parameter identifier corresponding to an identifier of the mobile computing device being configured.

At step 420, the master configuration file can be accessed to read one or more parameter records identified by the parameter identifiers selected at step 410. Each parameter record can comprise a parameter value corresponding to a given parameter identifier.

As noted herein supra, the configuration files can be accessed by the mobile computing device being configured, by an external computer, or by a peer mobile computing device.

At step 430, the configuration data selected at step 420 can be transferred to the mobile computing device being configured. As noted herein supra, in one embodiment, the configuration data can be transferred to the mobile computing device over a network. In another embodiment, the configuration data can be encoded in one or more decodable indicia symbols to be read and decoded by the mobile computing device. A skilled artisan would appreciate the fact that other methods of transferring configuration data to mobile computing devices are within the scope of this disclosure.

At step 440, the mobile computing device can be configured. As noted herein supra, the mobile computing device can be reconfigured by assigning parameter values to the specified parameters. In one embodiment, the mobile computing device can launch a configuration application responsive to receiving configuration data over the device's communication interface. In one embodiment, the mobile computing device can launch a configuration application responsive to reading and decoding one or more decodable indicia symbols containing configuration data. In a further aspect, the configuration data can include the identifier and/or parameter of the configuration application to be launchd by the mobile computing device.

The method can terminate upon completing step 440.

As noted herein supra, in one embodiment, a mobile computing device configurable using the methods described herein can be provided by an encoded information reading (EIR) terminal.

Figure 5A:
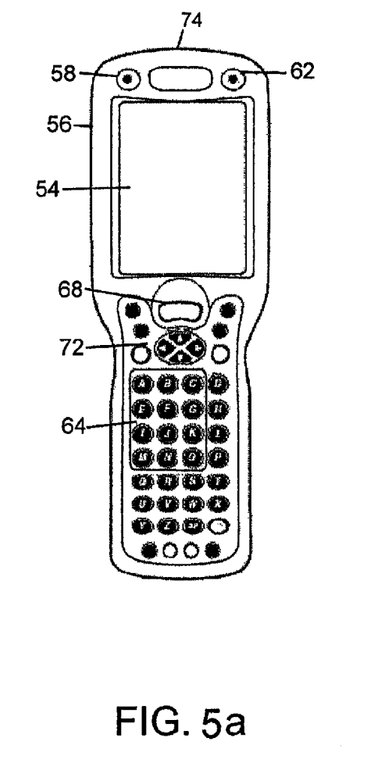
FIGS. 5a-5c and 6 schematically illustrate embodiments of an EIR terminal.

One embodiment of EIR terminal 100 is shown in in FIGS. 5a (front panel view), 5b (side panel view), and 5c (bottom panel view). EIR terminal 100 can comprise housing 52 within which other components of EIR terminal 100 can be disposed. LCD screen display with touch screen sensor 54 can be disposed on the front panel 56. Also disposed on front panel 56 can be decode LED 58, scan led 62, and keyboard 64 including scan key 68 and navigation keys 72. Imaging window 74 can be disposed on the top panel of housing 52. Disposed on the side panel (best viewed in FIG. 5b) can be infra-red communication port 76, access door to a secure digital (SD) memory interface 78, audio jack 80, and hand strap 82. Disposed on the bottom panel (best viewed in FIG. 5c) can be multi-pin mechanical connector 84 and hand strap clip 86.

Figure 5B:
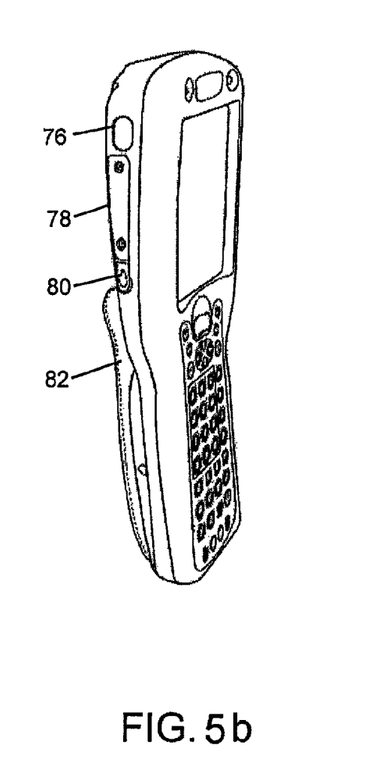
Figure 5C:
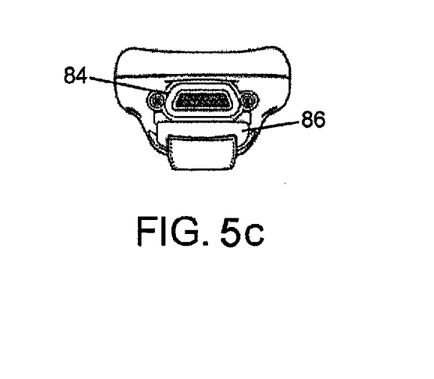
Figure 6:
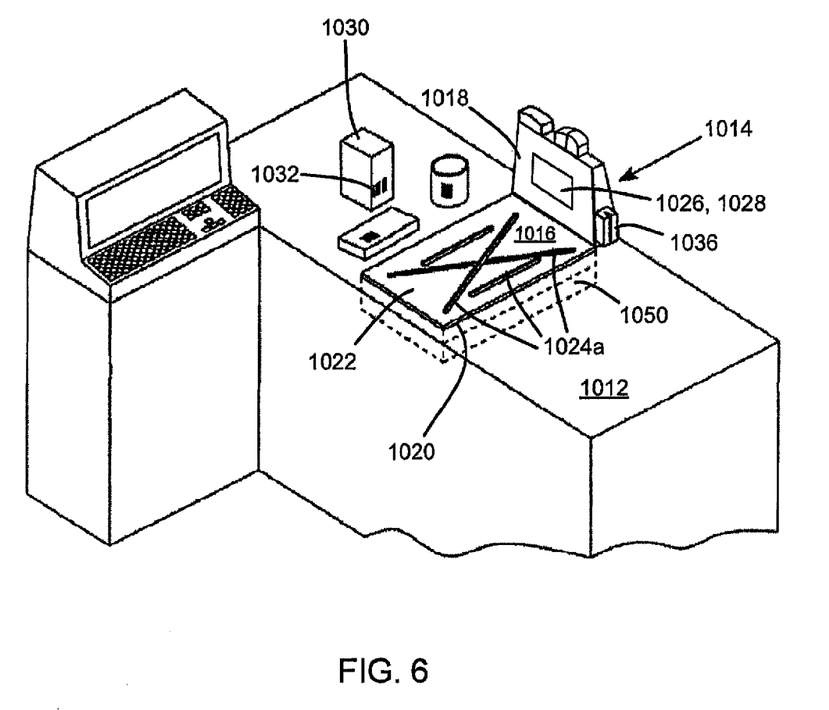

While FIGS. 5a-5c illustrate a hand held housing, a skilled artisan would appreciate the fact that other types and form factors of terminal housings are within the scope of this disclosure. For example, in one embodiment schematically shown in FIG. 6, an EIR terminal can be incorporated into a POS workstation with a presentation housing. The workstation 1010 can include a horizontal countertop 1012 for placement of products to be scanned. A bioptic scanner 1014 mounted within the countertop 1012 can include a first housing portion 1016 and a second housing portion 1018 which can project from one end of the first housing portion in a substantially orthogonal manner. In one embodiment, the first housing portion 1016 can comprise a laser-based indicia scanning terminal and the second housing portion 1018 can comprise an imager-based terminal. The countertop 1012 can include an optically transparent (e.g., glass) horizontal-scanning window 1020 mounted flush with the checkout counter, covered by an imaging window protection plate 1022 which can be provided with a pattern of apertures 1024a. The second housing portion 1018 can further include a vertical-scanning window 1026 behind which an imager-based indicia reading terminal 1028 can be housed. A skilled artisan would appreciate the fact that other ways of disposing the scanners and scanning windows are within the scope of this disclosure.

Figure 7:
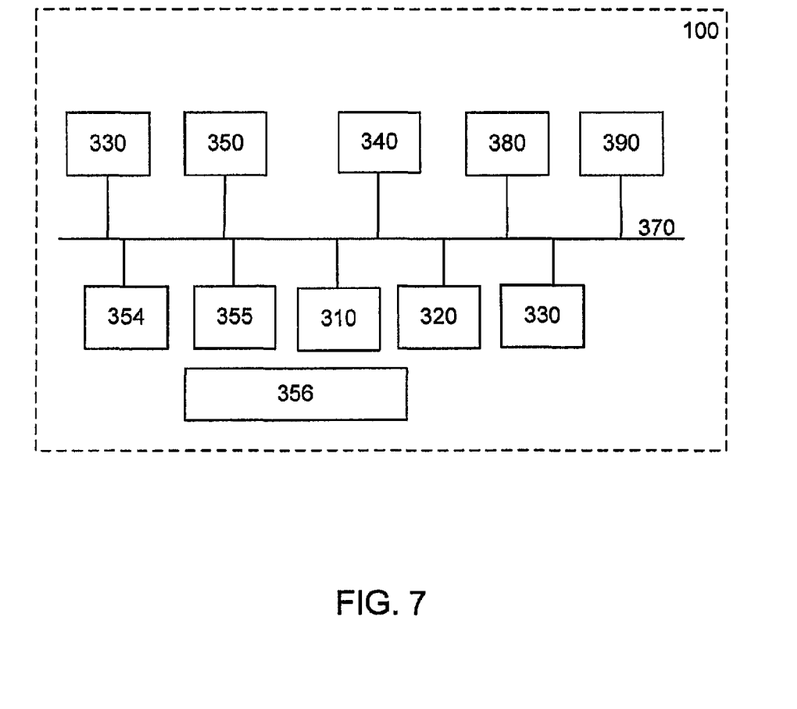
FIG. 7 depicts component-level layout of an EIR terminal.

Component-level diagram of one embodiment of an EIR terminal is now being described with references to FIG. 7. EIR terminal 100 can comprise at least one microprocessor 310 and a memory 320, both coupled to the system bus 370. The microprocessor 310 can be provided by a general purpose microprocessor or by a specialized microprocessor (e.g., an ASIC). In one embodiment, EIR terminal 100 can comprise a single microprocessor which can be referred to as a central processing unit (CPU). In another embodiment, EIR terminal 100 can comprise two or more microprocessors, for example, a CPU providing some or most of the EIR terminal functionality and a specialized microprocessor performing some specific functionality. A skilled artisan would appreciate the fact that other schemes of processing tasks distribution among two or more microprocessors are within the scope of this disclosure.

EIR terminal 100 can further comprise a communication interface 340 communicatively coupled to the system bus 370. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

EIR terminal 100 can further comprise a keyboard interface 354 and a display adapter 355, both also coupled to the system bus 370. EIR terminal 100 can further comprise a battery 356. In one embodiment, the battery 356 can be provided by a replaceable rechargeable battery pack.

EIR terminal 100 can further comprise a GPS receiver 380. EIR terminal 100 can further comprise at least one connector 390 configured to receive a subscriber identity module (SIM) card.

EIR terminal 100 can further comprise one or more EIR devices 330, provided, for example, but not limited to, by an RFID reading device, a bar code reading device, or a card reading device. In one embodiment, the RFID terminal can be configured to read an encoded message using EIR device 330, and to output raw message data containing the encoded message. In another embodiment, the RFID terminal can be configured to read an encoded message using EIR device 330, and to output decoded message data corresponding to the encoded message. As used herein, "message" is intended to denote a character string comprising alphanumeric and/or non-alphanumeric characters. An encoded message can be used to convey information, such as identification of the source and the model of a product, for example, in a UPC code.

Of course, devices that read bar codes, read RFID, or read cards bearing encoded information may read more than one of these categories while remaining within the scope of this disclosure. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be considered such a device; for example, a cellular telephone, smartphone, or PDA that is capable of reading bar codes is a device that read bar codes for purposes of this disclosure.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A small sample of systems, methods, and apparata that are described herein is as follows:

A1. A method of storing configuration data for mobile computing devices, said method comprising the steps of:
providing a master configuration file including one or more parameter records, each parameter record mapping a parameter value to a parameter identifier; and
providing a device file including one or more device records, each device record mapping a parameter identifier to a mobile computing device identifier.

A2. The method of A1, wherein said mobile computing device identifier is provided by one of: a serial number of said mobile computing device; a model number of said mobile computing device.

A3. The method of A1, wherein said master configuration file is accessible by one or more mobile computing devices.

A4. The method of A1, wherein said device file is accessible by one or more mobile computing devices.

A5. The method of A1, wherein said master configuration file is an XML file.

A6. The method of A1, wherein said device file is an XML file.

A7. The method of A1, wherein said master configuration file comprises at least one wireless communication interface parameter.

A8. The method of A1, wherein said master configuration file comprises at least one network configuration parameter.

A9. The method of A1, wherein said master configuration file comprises at least one power management parameter.

A10. The method of A1, wherein said master configuration file comprises at least one parameter defining a device registry setting.

A11. The method of A1, wherein said master configuration file comprises at least one application parameter.

B1. A method of configuring a mobile computing device, said method comprising the steps of:
reading a device file to select one or more device records comprising one or more parameter identifiers corresponding to an identifier of said mobile computing device;

reading a master configuration file to select one or more parameter records comprising parameter values corresponding to said one or more parameter identifiers; and configuring said mobile computing device by assigning said parameter values to said one or more parameter identifiers.

B2. The method of B1, wherein said steps of reading said parameter list file and said master configuration file are performed by said mobile computing device.

B3. The method of B1, wherein said steps of reading said parameter list file and said master configuration file are performed by a device other than said mobile computing device.

B4. The method of B1 further comprising, before said step of configuring said mobile computing device, the step of transmitting said one or more parameter identifiers and said parameter values to said mobile computing device.

B5. The method of B1 further comprising, before said step of configuring said mobile computing device, the steps of:

creating a device configuration file including said one or more parameter identifiers and said parameter values;

transmitting said device configuration file to said mobile computing device.

B6. The method of B1 further comprising, before said step of configuring said mobile computing device, the step of creating one or more decodable indicia symbols encoding said one or more parameter identifiers and said parameter values.

B7. The method of B1 further comprising, before said step of configuring said mobile computing device, the steps of:

creating one or more decodable indicia symbols encoding said one or more parameter identifiers and said parameter values; and reading said one or more decodable indicia symbols by said mobile computing device.

B8. The method of B1 further comprising, before said step of configuring said mobile computing device, the step of launching a configuration application on said mobile computing device.

B9. The method of B1, wherein said identifier of said mobile computing device is provided by one of: a serial number of said mobile computing device; a model number of said mobile computing device.

B10. The method of B1, wherein said master configuration file is an XML file.

B11. The method of B1, wherein said parameter list file is an XML file.

The invention claimed is:

1. A method of storing configuration data for mobile computing devices, said method comprising the steps of:

providing a master configuration file including one or more parameter records for multiple mobile computing devices or types of mobile computing devices, each parameter record mapping a parameter value to a parameter identifier; and providing a device file including one or more device records, each device record mapping a parameter identifier to a mobile computing device identifier;

wherein the parameter records are consistent for the multiple mobile computing devices or types of computing devices.

2. The method of claim 1, wherein said mobile computing device identifier is provided by one of: a serial number of a mobile computing device; a model number of a mobile computing device.

3. The method of claim 1, wherein said master configuration file is accessible by one or more mobile computing devices.

4. The method of claim 1, wherein said device file is accessible by one or more mobile computing devices.

5. The method of claim 1, wherein said master configuration file is an XML file.

6. The method of claim 1, wherein said device file is an XML file.

7. The method of claim 1, wherein said master configuration file comprises at least one wireless communication interface parameter.

8. The method of claim 1, wherein said master configuration file comprises at least one network configuration parameter.

9. The method of claim 1, wherein said master configuration file comprises at least one power management parameter.

10. The method of claim 1, wherein said master configuration file comprises at least one parameter defining a device registry setting.

11. The method of claim 1, wherein said master configuration file comprises at least one application parameter.

12. A method of configuring a mobile computing device, said method comprising the steps of:

reading a device file to select one or more device records comprising one or more parameter identifiers corresponding to an identifier of said mobile computing device;

reading a master configuration file to select one or more parameter records comprising parameter values corresponding to said one or more parameter identifiers, wherein said master configuration file includes one or more parameter records for multiple mobile computing devices or types of mobile computing devices; and configuring said mobile computing device by assigning said parameter values to said one or more parameter identifiers;

wherein the parameter records are consistent for the multiple mobile computing devices or types of computing devices.

13. The method of claim 12, wherein said steps of reading said device file and said master configuration file are performed by said mobile computing device.

14. The method of claim 12, wherein said steps of reading said device file and said master configuration file are performed by a device other than said mobile computing device.

15. The method of claim 12 further comprising, before said step of configuring said mobile computing device, the step of transmitting said one or more parameter identifiers and said parameter values to said mobile computing device.

16. The method of claim 12 further comprising, before said step of configuring said mobile computing device, the steps of:

creating a device configuration file including said one or more parameter identifiers and said parameter values;

transmitting said device configuration file to said mobile computing device.

17. The method of claim 12 further comprising, before said step of configuring said mobile computing device, the step of creating one or more decodable indicia symbols encoding said one or more parameter identifiers and said parameter values.

18. The method of claim 12 further comprising, before said step of configuring said mobile computing device, the steps of:

creating one or more decodable indicia symbols encoding said one or more parameter identifiers and said parameter values; and reading said one or more decodable indicia symbols by said mobile computing device.

19. The method of claim 12 further comprising, before said step of configuring said mobile computing device, the step of launching a configuration application on said mobile computing device.

20. The method of claim 12, wherein said identifier of said mobile computing device is provided by one of: a serial number of said mobile computing device; a model number of said mobile computing device.

21. The method of claim 12, wherein said master configuration file is an XML file.

22. The method of claim 12, wherein said device file is an XML file.

\* \* \* \* \*